United States Patent Office 3,578,567
Patented May 11, 1971

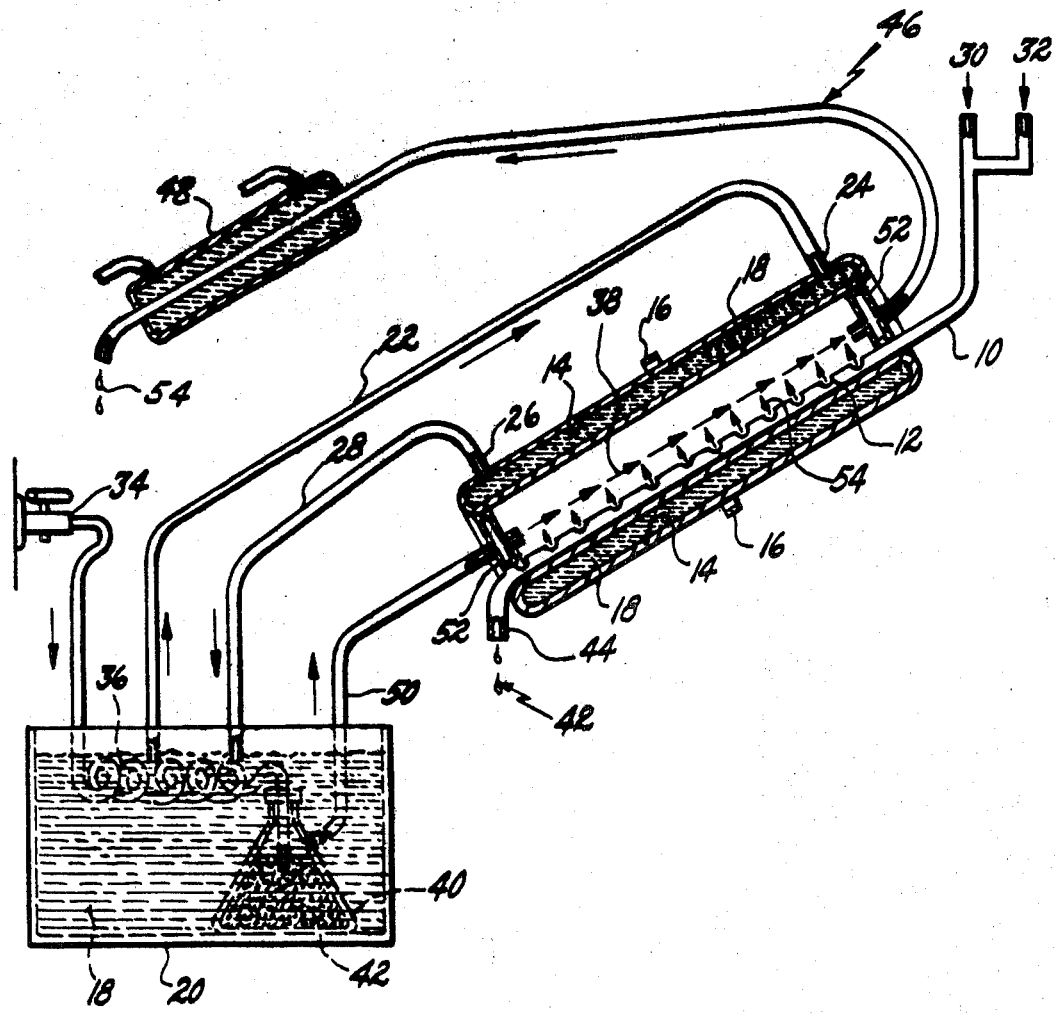

3,578,567
PROCESS AND APPARATUS FOR THE CONTINUOUS FLOW, IN-LINE FRACTIONATION AND EXCHANGE OF VOLATILE SOLVENTS
Harry H. Malvin, Houston, Tex. (585 Carriage Way, Deerfield, Ill. 60015), and Marion J. Stansell, San Antonio, Tex. (8260-H Jamboree Circle, Colorado Springs, Colo. 80907)
Filed Oct. 31, 1968, Ser. No. 772,337
Int. Cl. B01d 3/34, 11/02
U.S. Cl. 203—49
9 Claims

ABSTRACT OF THE DISCLOSURE

A method for separating the individual solvent components from a mixture of miscible solvents present together in a single solvent system. This method also provides for the continuous flow, in-line fractionation and exchange of miscible liquids of differing volatilization characteristics. A solvent mixture is introduced into a heated, inclined, perforated conduit. As the solvent mixture descends the heated conduit, a countercurrent stream of heated inert gas, saturated with vapors of the same solvent component to be retained in the conduit, is passed over the perforations. Preferential evaporation of the more volatile solvent components occurs, resulting in near complete removal of these components by the time the solvent mixture exits at the bottom of the conduit with the less volatile solvent component remaining within the conduit for subsequent collection.

BACKGROUND OF THE INVENTION

This invention relates to a method for separating the individual components from a solvent mixture. More particularly, this invention concerns itself with a method for the continuous flow, in-line fractionations and exchange of volatile solvent components from a solvent system comprising a mixture of miscible solvents each possessing different volatilization characteristics.

A variety of industrial applications require the separation or purification of solvent mixtures. A number of techniques for effecting such a separation are well known, however, such techniques do not lend themselves for use in automated analytical chemical procedures. Automation of these procedures has been complicated by the lack of a method for fractionating or exchanging solvents in-line. For example, the full automation of the procedure for analyzing the cholesterol and glyceride content in human serum is almost impossible because ethanolic potassium hydroxide cannot be continuously substituted or exchanged for diethyl ether in an automated manner. The diethyl ether solvent is used to extract the soluble lipid fraction from the blood serum which must then be transferred to an absolute ethanol-potassium hydroxide solvent for hydrolysis and for the subsequent solution in water. A system which could provide an effective and continuous transition between the extraction and hydrolysis steps would be extremely beneficial and permit the precise and accurate evaluation of an unprecedented large number of biological samples.

A process for accomplishing a fully automated solvent separation technique for use in analytical chemical procedures should include several features. It should at least provide for the total removal of one of the components of a binary solvent system (e.g., diethyl ether) and the near quantitative retention of the second component containing all non-volatile solutes (e.g. ethanolic potassium hydroxide with dissolved lipid substance). The procedure should not be conducive to altering heat labile constituents. Additionally, it should be highly predictable and reproducible and, by an appropriate choice of processing parameters, should be applicable to a wide variety of solvent systems. The present invention, the details of which are pointed out hereinafter, provides a system which encompasses the criteria outlined above and provides for the automation of solvent separation and purification techniques presently utilized in a variety of industrial applications.

SUMMARY OF THE INVENTION

In accordance with the method of this invention, the individual solvent components of a solvent system can be separated one from another or exchanged one for another, by passing a solvent mixture through a heated perforated conduit while simultaneously passing a countercurrent stream of a heated inert gas over the perforations. The conduit may be positioned at any angle from the horizontal to the vertical with the solvent mixture passing through the conduit by gravity flow or the use of a conventional pumping system. The heated inert gas is saturated with the vapors of the same volatile solvent which is to be retained within the conduit. The passing of the saturated gas over the liquid solvent mixture flowing down the inclined conduit effects a reduction in the atmospheric pressure over the liquid phase. As a consequence, the more volatile solvent component evaporates resulting in the almost complete removal of this component from the solvent mixture.

The method of this invention is applicable to solvent systems containing no azeotropes, as well as to those possessing a minimum boiling azeotrope. By manipulating the processing parameters, this pprocess can be applied to a wide variety of solvent systems and is fully compatible with automated analytical chemical procedures. The method finds particular use in the total automation of blood serum glyceride, cholesterol and phospholipid assays resulting in a highly precise and accurate assay of a large number of such biological samples with a minimum of attendance.

Accordingly, the primary object of this invention is to provide a method for separating the individual solvent components of a solvent system.

Another object of this invention is to provide a method for the continuous flow, in-line fractionation or exchange of volatile solvents.

Still another object of this invention is to provide a method for the standardized and reproducible separation of miscible solvents present together in a solvent system.

A further object of this invention is to provide a method which can effect the total removal of one volatile component of a binary solvent system and the near quantitative retention of a second volatile component which contains all non-volatile solutes.

Still a further object of this invention is to provide a method for separating the individual solvents from a solvent mixture which is not conductive to the alteration of heat labile constituents within the mixture.

A still further object of this invention is to provide a method for separating volatile solvents which is highly predictable and reproducible, is applicable to a wide variety of solvent systems and lends itself for particular use with automated analytical chemical procedures.

These and still further objects and advantages of the present invention will become readily apparent from the description of the invention which follows when taken in conjunction with the accompanying drawing.

BRIEF DESCRIPTION OF THE DRAWING

In the drawings:

The figure represents a cross-sectional view of an apparatus suitable for use with the method of this invention.

DESCRIPTION OF THE PREFERRED EMBODIMENT

Pursuant to the objects of this invention, the present method involves the steps of introducing a solvent mixture or system to a heated, perforated conduit. The solvent mixture is allowed to pass through the perforated conduit at a velocity determined by the angle of the conduit with respect to the horizontal and the introduction pumping rate. As the solvent mixture passes through the heated conduit, a countercurrent flow of heated air or inert gas, saturated with the vapors of the solvent component to be retained in the conduit, is simultaneously passed over the perforations. The countercurrent flow of gas is maintained at the same temperature as the temperature of the heated conduit. As the gas passes over the solvent mixture, the preferential evaporation of the more volatile solvent component of the mixture occurs resulting in near complete removal of this component by the time the solvent system emerges from the bottom of the conduit for subsequent collection.

Referring now to the drawing, there is shown an apparatus suitable for use in the practice of this invention. The apparatus comprises a conduit 10, shown in an inclined position, with a plurality of perforations 12. The conduit 10 is composed of a non-wettable material, such as Teflon, which is likewise inert to the solvents being used. A glass water jacket 14 surrounds the conduit 10 for maintaining a predetermined temperature. A support clamp 16 supports the assembly so that its angle can be adjusted through 90° with respect to the horizontal. The temperature of the water jacket 14 is controlled by the temperature of the water 18 provided by the adjustable, heated, constant-temperature water bath 20. The heated water 18 flows through tubing 22 and water input 24 into water jacket 14 and subsequently returns to the water bath 20 by means of water output 26 and tubing 28. The solvent mixture is introduced to the inclined conduit 10 by means of input tubes 30 and 32. A gas source 34 provides a supply of an inert gas, such as nitrogen, or air, which exits through a coiled tube 36 positioned within the heated water bath 20 so that the exiting gas stream 38 is the same temperature as the water jacket 14. The gas 38 first passes though a flask 40 containing the same solvent substance 42 as that to be retained as a solvent liquid in conduit 10 and ultimately collected at 44. The gas 38 becomes saturated with the vapors of the component 42 in flask 40 and then passes through tubing 50 and flows as a countercurrent stream over the perforations 12. During operation, a solvent mixture is introduced through input tubes 30 and 32 at a predetermined pumping rate by means of a conventional displacement-type Teflon pump not shown. All tubing is likewise made of an inert material such as Teflon.

The temperature of the water jacket 14 and countercurrent flow of gas 38 is selected to permit volatilization of the solvent components with boiling points lower than that of the solvent component 42 which is to be retained in the fluid state within the conduit 10 and ultimately collected at exit point 44. The more volatile solvent component 54 evaporates, passes through the perforations 12 and is entrapped in the gas flow 38. This component then passes out of the system through outlet tubing 46 to a cooling condenser 48 where the more volatile component 54 may be salvaged if desired. The input and output junctures are mounted in inert end support plates 52. This provides for a relatively closed space with minimum turbulence.

The preselected temperature of the water jacket 14 and gas steam 38 provides an equilibrium between the liquid phase of the relatively higher boiling point component 42 and the vapor phase of this same component provided at flask 40. This equilibrium obviates loss of the higher boiling point liquid from the perforated conduit 10. As the solvent mixture flows down the conduit 10, then the ratio of higher boiling point solvent to lower boiling point solvent gradually increases until only the purified higher boiling point solvent emerges at exit 44 free from the other components. The process is versatile in that it can be adapted to a variety of solvent systems by the manipulation of the various processing parameters such as water jacket and countercurrent gas stream temperature, angle of incline, length of transit in the perforated conduit, number and size of perforation and the velocity of the countercurrent gas flow.

A specific application of the process of this invention can be found with the solvent system employed in the chemical analysis of cholesterol and triglycerides in blood serum. This solvent system comprises four parts of diethyl ether extract of serum containing glyceride and cholesterol lipid components plus one part ethanolic potassium hydroxide (0.1 grm. KOH in 25 Nl. ethanol). The lipid components, which have been extracted by the ether, must be transferred to the ethanolic potassium hydroxide for hydrolysis and subsequent assay. To effect exchange of the lipid components, the diethyl ether extract is pumped into input tube 30, while the ethanolic potassium hydroxide is pumped into input tube 32. The solvents mix and the resultant binary system descends through the Teflon conduit 10. The total length of the assembly is 36 mm. The internal diameter of the water jacket 14 is 1.1 cm., and the Teflon conduit 10 has an internal diameter of 0.15 cm. The perforations 12 on the upper surface of the conduit 10 are 0.1 cm. in diameter and are spaced 0.8 cm. apart. A Forma adjustable, constant-temperature, circulating water bath 20 heats the water 18 for the water jacket 14, as well as the liquid 42 saturating the countercurrent air stream 38. All tubing and pumps are made of Teflon.

The binary solvent system is permitted to descend the conduit 10 which is maintained at a temperature intermediate between the boiling point of pure diethyl ether and ethanol. The countercurrent flow of air 38, also maintained at the same temperature as the conduit 10 and saturated with absolute ethanol, is allowed to flow over the perforations 12 in a countercurrent direction. At this point, the diethyl ether molecules rapidly pass from the liquid to the vapor phase and pass out of the apparatus through tubing 46. Since the ethanolic potassium hydroxide is in a state of equilibrium with the ethanol saturated air stream passing over the perforations, the net transfer of ethanol from the liquid to the vapor phase is minimal and the ethanolic-potassium hydroxide solvent component remains in the conduit 10 along with the lipid component formerly contained in the diethyl ether for subsequent collection at exit 44.

The effectiveness of the method of this invention in completing the removal of ether and the quantitative recovery of the ethanolic potassium hydroxide and lipid components from a binary solvent system are shown in Tables I and II. The results were obtained over a range of temperatures and solvent delivery rates using a constant countercurrent air flow rate of 3 liters per minute and a static conduit angle with respect to the horizontal of 15°. Glyceride and cholesterol assays were made using a conventional analytical technique.

TABLE I

Recoveries of glyceride and cholesterol following solvent exchange [1]

| Sample | Predistillation values (mg. percent) | | Postdistillation values (mg. percent) | | | | Percent recovery | | | |
|---|---|---|---|---|---|---|---|---|---|---|
| | | | Glyceride | | Cholesterol | | Glyceride | | Cholesterol | |
| | Glyceride | Cholesterol | Range | Mean | Range | Mean | Range | Mean | Range | Mean |
| 1 | 101 | 191 | 75–95 | 87 | 187–190 | 188 | 74.2–94.1 | 87.0 | 98.0–99.5 | 98.5 |
| 2 | 225 | 229 | 171–240 | 202 | 195–225 | 206 | 76.0–106.6 | 89.8 | 85.2–98.2 | 90.1 |
| 3 | 79 | 205 | 74–97 | 86 | 157–228 | 198 | 93.7–122.3 | 108.6 | 76.8–111.1 | 96.8 |
| 4 | 168 | 218 | 157–203 | 177 | 123–241 | 193 | 93.5–120.8 | 105.4 | 56.4–111.5 | 88.6 |
| 5 | 124 | 230 | 90–133 | 111 | 173–228 | 203 | 72.6–107.2 | 89.6 | 75.3–99.2 | 88.4 |
| 6 | 150 | 170 | 133–188 | 161 | 139–177 | 160 | 88.7–125.2 | 107.2 | 81.9–104.1 | 94.3 |

[1] All post-distillation assays were performed on three separate aliquots. The distillation temperature was held constant at 60° C., and a solvent delivery rate of 3 ml. per minute was employed. The recovery of the ethanol phase was essentially complete in each case. The precision control limits established for the glyceride and cholesterol assay (1) in our laboratory are ±8.3% and ±9.3%, respectively, for 68% confidence, and ±24.9% and ±27.9%, respectively, for 99.7% confidence.

TABLE II

Effect of some operating parameters on solvent exchange [1]

| Temperature (° C.): | Solvent flow rate (ml./min.) | Ether in effluent | Retention of ethanol (percent) |
|---|---|---|---|
| 40 | 0.5 | – | Near 100. |
| | 1.0 | + | |
| | 2.0 | + | |
| 50 | 0.5 | – | 40–50 |
| | 1.0 | – | 80–90 |
| | 1.5 | – | Near 100. |
| | 2.0 | – | Do. |
| | 2.5 | – | Do. |
| | 3.0 | + | |
| | 4.0 | + | |
| 60 | 0.5 | – | 30–40 |
| | 1.0 | – | 40–50 |
| | 2.0 | – | 80–90 |
| | 2.5 | – | Near 100. |
| | 3.0 | – | Do. |
| | 3.5 | – | Do. |
| | 4.0 | + | |
| | 6.0 | + | |
| 65 | 2.5 | – | 80–90 |
| | 3.0 | – | Near 100. |
| | 3.5 | – | Do. |
| | 4.0 | – | Do. |
| | 4.5 | + | |

[1] The distillation apparatus was maintained at an angle of 15° throughout this evaluation. The countercurrent air stream saturated with ethanol was delivered to the distillation apparatus at a rate of 3 liters per minute.

It is apparent from the results above that with the particular configuration and conditions employed, a maximum flow rate of 4.0 to 4.5 ml. per minute can be used. This quantity could be increased somewhat by lengthening the perforated conduit or decreasing the angle with the horizontal, thus increasing the length of time that the solvent system is at the distillation temperature.

The flow rates of 2.5 to 3.5 ml. per minute found to be usable at 60° C. are satisfactory for the automated assay of serum glycerides and cholesterol. In addition, since the subsequent hydrolysis process takes place at 60° to 65° C., little temperature readjustment is required.

It is interesting that at the lowest flow rates at 50°, 60° and 65° C., there is less than complete recovery of the ethanol phase. In addition, the volumes of ethanol recovered at these flow rates reflected greater variability than was observed when retention of the ethanol was nearly complete. This apparent deviation from theoretic performance may be due to rapid vaporization of the reduced volume of ether in the early portion of the perforated conduit, resulting in turbulence being established within the conduit between the upper surface of the liquid ethanol and the saturated vapor phase in the countercurrent air stream. This would result in some loss of liquid ethanol before equilibrium could be attained.

Recovery of non-volatile lipid components in extracts of sera was determined by quantitating glyceride and cholesterol levels in the ether phase before distillation and in the ethanolic KOH phase after distillation. The data of Table I indicates near complete recovery of the components of interest. The deviations are within the 60% confidence limits established for the conventional procedure employed. The rather wide variations in recovery may well reflect the large number of manipulations encountered by the samples between the pre- and post-distillation assays, as well as the inherent limitations of the assay procedure.

It was found desirable to maintain the temperature of the countercurrent gas stream at the appropriate level throughout its route until it had emerged from the distillation apparatus. Any reduction of temperature between the point of saturation of the gas with ethanol and its entrance into the distillation tube resulted in ethanol condensation with a consequent reduction in degree of saturation of the gas stream as it entered the latter higher temperature apparatus. The resultant shift of ethanol from the flowing binary solvent system into the unsaturated countercurrent gas stream led, therefore, to a reduction of volume of ethanolic KOH in the effluent.

Clearly, the method of this invention constitutes a balance of several operating parameters, all of which must be set for a particular operation. From Table II, it is evident that considerable latitude is possible in terms of solvent flow rate and, therefore, the required balance of operating conditions is relatively non-critical and readily established.

This invention is quite adequate for the specific requirement of exchanging ethanolic potassium hydroxide for diethyl ether with complete retention of non-volatile lipid components. Readily determined operating parameters and complete recovery of the desired solutes make the system fully compatible with an in-line, continuous flow, automated assay.

From a consideration of the foregoing, it can be seen that the present invention provides a highly effective method for separating the individual solvent components from a solvent mixture and finds particular application in automated analytical chemical techniques requiring a continuous flow, in-line exchange of volatile solvents. In terms of epidemiological, environmental health, clinical and industrial surveys, this invention permits the accurate, rapid and precisely controlled solvent fractionation or exchange attendant to urine and blood serum extractions for steroid analyses, toxicological evaluations and lipid assays. It can likewise be utilized to prepare and continuously purify critical reagents in clinical and research laboratories. Obviously, various modifications may be made within the scope of the invention, as will be apparent to those skilled in the art.

What is claimed is:

1. A method for the continuous flow, in-line exchange of volatile solvents present together in a binary solvent system which comprise the steps of: introducing said binary solvent system at a predetermined flow rate to an inclined, perforated conduit while maintaining said solvent system at a predetermined temperature; allowing said solvent system to descend the length of the perforated conduit while simultaneously passing a countercurrent flow of a heated, inert gas saturated with the same low volatility vapors of the solvent component which is to be retained in said solvent system; maintaining said gas at the same temperature as that of the solvent mixture in order to effect preferential evaporation and removal of the solvent component having a relatively high degree of volatility.

2. A method in accordance with claim 1 wherein said binary solvent system comprises a mixture of a relatively high volatile diethyl ether extract of non-volatile lipid components and a relatively low volatile ethanolic-potassium hydroxide solvent material.

3. A method for the continuous flow, in-line exchange of a soluble, non-volatile material from a relatively high volatile solvent to a relatively low volatile solvent comprising the steps of introducing said high volatile solvent and said low volatile solvent to a heated, inclined, perforated conduit to effect a mixture thereof which mixture possesses a boiling point which is less than the boiling point of at least one of said solvents; flowing said solvent mixture the length of said conduit at a predetermined rate, simultaneously passing a countercurrent flow of an inert gas saturated with vapors from the low volatile solvent over the solvent mixture, simultaneously maintaining said solvent mixture and said saturated gas at a temperature sufficient to establish a state of equilibrium between the vapor phase of the saturated gas and the liquid phase of the less volatile solvent component; preferentially evaporating and removing the higher volatile solvent component thereby retaining the soluble, non-volatile material in the less volatile solvent component.

4. A method in accordance with claim 3 wherein said relatively high volatile solvent is a diethyl ether extract of blood serum containing glyceride and cholesterol lipid components and said relatively low volatile solvent is ethanolic potassium hydroxide.

5. A method for separating a solvent component having relatively low volatility characteristics from a solvent system composed of a plurality of solvent components each with different volatilization characteristics and in which the boiling point of the solvent system is lower than the boiling point of at least one of the solvent components of the system which method comprises the steps of: flowing the solvent system through an inclined, perforated conduit at a predetermined rate while maintaining said system within a predetermined temperature range; simultaneously passing over said solvent system, a countercurrent flow of an inert gas saturated with vapors from the same low volatile solvent which is to be retained in the solvent system in order to effect preferential evaporation and removal of the higher volatile solvent components from said system.

6. A distillation apparatus for effecting the separation of individual solvent components from a solvent wherein the boiling point of the solvent system is less than the boiling point of at least one of the individual components of the solvent system comprising a first conduit, a second perforated conduit positioned within said first conduit, means for heating both of said conduits, a source of inert gas, means connected with said source of inert gas for saturating said inert gas with a second gas, means connecting said source of saturated gas with one end of said first conduit for flow therethrough, means for introducing a solvent system into said second conduit at an inlet opposite said one end of said first conduit for countercurrent flow of said inert gas and said solvent mixture whereby preferential evaporation and recovery of individual higher volatile solvent components of said solvent mixture are effected.

7. An apparatus in accordance with claim 6 including a condenser means positioned at the other end of said first conduit.

8. An apparatus in accordance with claim 6 including means for adjusting the angular orientation of said conduits.

9. An apparatus in accordance with claim 6 wherein said perforations are located such that when said conduits are in the horizontal position they are in the upper portion of said second conduit.

References Cited

UNITED STATES PATENTS

| | | | |
|---|---|---|---|
| 3,007,852 | 11/1961 | Hunter et al. | 203—49 |
| 3,087,867 | 4/1963 | Bortolini et al. | 203—49 |
| 3,170,767 | 2/1965 | Wistreich | 23—272.6(S) |
| 3,409,515 | 11/1968 | Baird et al. | 203—49 |

WILBUR L. BASCOMB, JR., Primary Examiner

U.S. Cl. X.R.

23—230B, 258.5, 272.6S; 202—234; 203—63, Dig. 2